(12) United States Patent
Mathur et al.

(10) Patent No.: US 11,307,957 B2
(45) Date of Patent: Apr. 19, 2022

(54) SYSTEMS AND METHODS FOR DETERMINING OPTIMAL COST-TO-SERVE FOR CLOUD APPLICATIONS IN THE PUBLIC CLOUD

(71) Applicant: salesforce.com, inc., San Francisco, CA (US)

(72) Inventors: Ashraya Raj Mathur, Fremont, CA (US); Bruno Manuel Torres Gomez, San Francisco, CA (US); Ronnie Fong, San Mateo, CA (US); Steven Bougon, San Francisco, CA (US); Jiten Oswal, San Francisco, CA (US); Mihirsinh Raol, Fremont, CA (US); Jianxun Jason Ding, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 325 days.

(21) Appl. No.: 16/677,145

(22) Filed: Nov. 7, 2019

(65) Prior Publication Data

US 2021/0141708 A1    May 13, 2021

(51) Int. Cl.
*G06F 11/34* (2006.01)
*G06F 11/30* (2006.01)
*G06F 11/32* (2006.01)
*G06F 9/50* (2006.01)

(52) U.S. Cl.
CPC .......... *G06F 11/3457* (2013.01); *G06F 9/505* (2013.01); *G06F 11/301* (2013.01); *G06F 11/323* (2013.01); *G06F 11/3442* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |

(Continued)

*Primary Examiner* — Craig C Dorais
(74) *Attorney, Agent, or Firm* — LKGlobal | Lorenz & Kopf, LLP

(57) ABSTRACT

Systems and methods for an elastic cost-to-serve system including a first module to orchestrate an elastic server set; a second module to orchestrate a load test and to apply one or more use-case scenarios for each orchestrated server set; a third module to generate a cost metrics model of the orchestrated server set for predictive cost modeling; a fourth module coupled to the third module to collect a plurality of performance metrics across the server resources and associated client devices; a fifth module to post-process the collected performance metrics across a load testing duration and to provide analytics of the server set performance; and a sixth module coupled to analyze the performance metrics adapting available resources and to apply a heuristic of the cost metrics model to predict a model of cost optimization of the server set.

20 Claims, 11 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 * | 6/2003 | Stauber ............. G06F 9/465 707/704 |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobsen |
| 8,015,495 B2 | 9/2011 | Achacoso et al. |
| 8,032,297 B2 | 10/2011 | Jakobsen |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,963,294 B2 | 3/2021 | Fornash et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 * | 1/2004 | Rothwein ............. G06F 8/38 715/763 |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobsen |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobsen et al. |
| 2013/0212497 A1 | 8/2013 | Zelenko et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2013/0247216 A1 | 9/2013 | Cinarkaya et al. |
| 2021/0141708 A1 | 5/2021 | Mathur et al. |

* cited by examiner

Cost to Serve Methodology
Optimal Cost To Serve based on increasing concurrency of users

| USER LOAD | MEMORY USAGE | CPU TIME % | HOURLY CTS PER USER |
|---|---|---|---|
| 100 users | 550 MB | 12 % | $6.67 |
| 200 users | 900 MB | 25 % | $3.33 |
| 300 users | 1.5 GB | 36 % | $2.22 |
| 400 users | 2.1 GB | 49 % | $1.67 |
| 500 users | 2.5 GB | 62 % | $1.33 |

FIG. 8A

Cost to Serve Methodology
Optimal Cost To Serve based on increasing concurrency of users

| USER LOAD | MEMORY USAGE | CPU TIME % | HOURLY CTS PER USER |
|---|---|---|---|
| 100 users | | 24 % | $3.67 |
| 200 users | | 36 % | $3.14 |
| 300 users | | 41 % | $2.40 |
| 400 users | | 45 % | $1.80 |
| 500 users | | 49 % | $1.60 |

FIG. 8B

SYSTEMS AND METHODS FOR DETERMINING OPTIMAL COST-TO-SERVE FOR CLOUD APPLICATIONS IN THE PUBLIC CLOUD

CROSS-REFERENCES TO RELATED APPLICATIONS

This Application is related to U.S. Non-Provisional Application, entitled SYSTEMS AND METHODS FOR REAL-TIME DETERMINATION OF COST-TO-SERVE METRICS AND COST ATTRIBUTION FOR CLOUD APPLICATIONS IN THE PUBLIC CLOUD, Ser. No. 16/677,237, filed on Nov. 7, 2019.

TECHNICAL FIELD

Embodiments of the subject matter described herein relate generally to measuring the performance of apps distributed on multiple platforms, and more particularly to an automated testing method and system for measuring app performance in virtual cross-platform and cross-browser end-to-end use-case scenarios and for gathering comprehensive measurements of metrics of transactions executed therein.

BACKGROUND

Current software development is evolving away from the client-server model toward network-based processing systems that provide access to data and services via the Internet or other networks. That is, in contrast to traditional methods that host networked applications on dedicated server hardware, a "cloud" computing model allows applications to be provided over the network "as a service" or "on-demand" by an infrastructure provider, the development trend is for the infrastructure provider to deliver a customer-developed application so that the customer no longer needs to operate and support dedicated server hardware by abstracting the underlying hardware and other resources used. This type of cloud computing model can often provide substantial cost savings to the customer over the life of the application because the customer no longer needs to provide dedicated network infrastructure, electrical and temperature controls, physical security, and other logistics to support dedicated server hardware to host an application.

It is desirable to further enhance this evolving development and deployment application architecture by providing a framework for cloud-agnostic Cost-To-Serve testing which abstracts public cloud infrastructure deployment, application deployment, launching applications, thereby enabling automating end-to-end use case scenarios, testing the scale under dynamically increasing load, collecting holistic performance measurements and determining optimal cost for these applications. In other words, it is desirable to enable a solution that integrates performance analysis for cloud applications with cost efficiency analysis in a convenient use architecture. This enables individual application and feature developers to analyze performance and cost efficiencies for their application use cases without requiring any manual intervention.

In addition, with the use of automated resource provisioning techniques, the implementation of elastic services is enabled for this architecture, thereby adapting the available resources to the service demand. This is essential for reducing power consumption and guaranteeing the quality of service (QoS) requirements for latency or response time ordinarily required for web servers with higher traffic load, data stream processing, or real-time big data analytics. It is desirable to implement the elasticity in cloud platforms and virtualized data-centers by various auto-scaling mechanisms that can make automated resource provisioning decisions based on the value of specific infrastructure and/or service performance metrics to accurately predict the processing load of a distributed server and estimate the appropriate number of resources that must be provisioned. This can optimize the service response time while attenuating resource over-provisioning in order to reduce energy consumption and infrastructure costs.

Current systems fail to provide an adequate solution for optimum app servers, databases, storage, network, and additional services performance and for load testing to orchestrate load tests from a plurality of use-case scenarios with a desired concurrency of simulated users in a multi-tenant environment. Hence, systems and methods are thus needed which address these shortcomings.

BRIEF DESCRIPTION OF THE DRAWINGS

A complete understanding of the subject matter may be derived by referring to the detailed description and claims when considered in conjunction with the following figures, wherein like reference numbers refer to similar elements throughout the figures.

FIGS. 8a and 8b illustrate an exemplary diagram of iterative tests with increasing concurrency to determine optimal cost-to-serve service in accordance with an embodiment;

DETAILED DESCRIPTION

Figure 1:
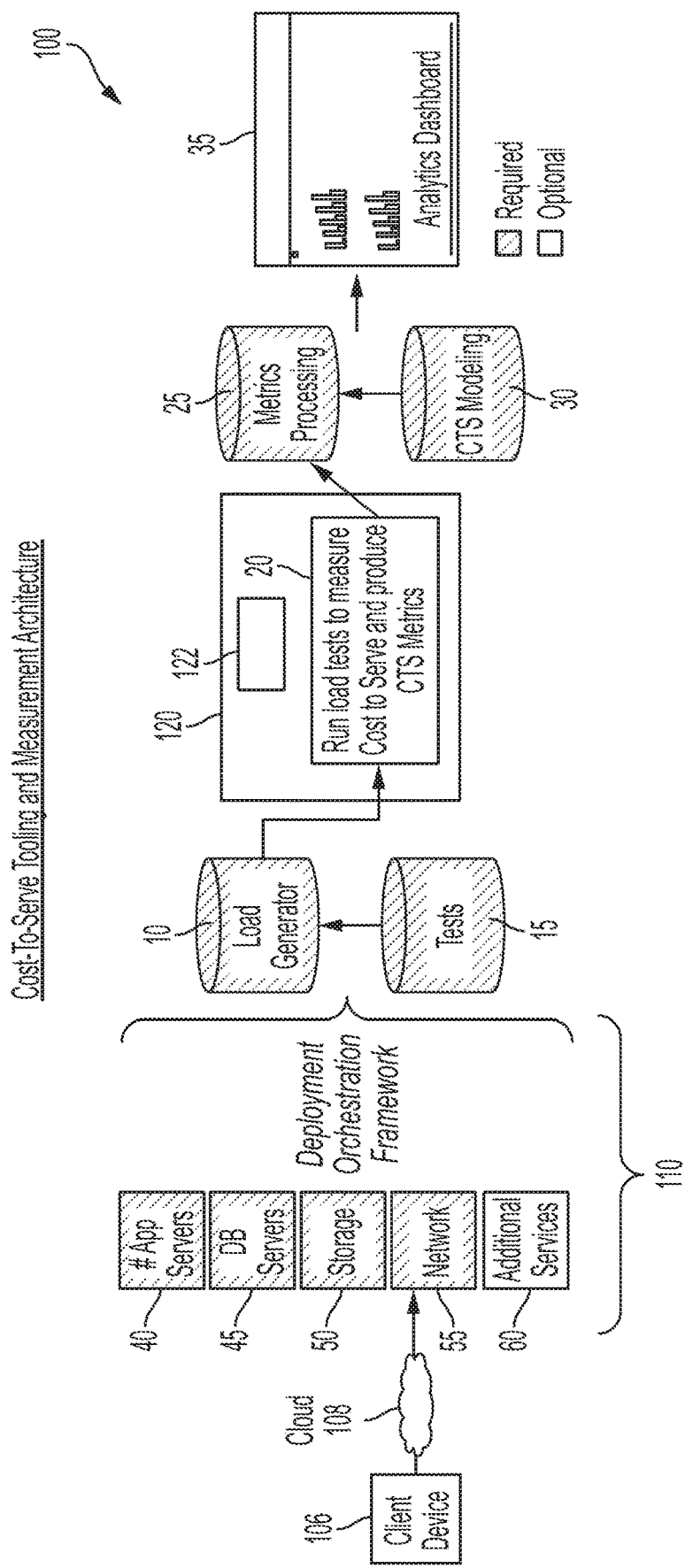
FIG. 1 is a functional diagram illustrating a cost-to-serve system for measuring performance and testing run loads for server configurations containing app servers, databases, storage devices, networks, and additional services in accordance with an embodiment.

Embodiments of the subject matter described herein generally relate to database systems and methods for measuring the cost of cloud applications using application use-case scenarios for optimum app servers, databases optimum app servers, databases, storage, network, and additional services configurations. In exemplary embodiments, load tests are orchestrated for server configurations to model cost metrics from a plurality of use-case scenarios of app servers, database servers, storage devices, load balancers, and networks.

The use of service elasticity is has become a necessary feature for cloud platforms and virtualized data-centers. Service elasticity is defined as the ability to adapt the system to workload changes, by autonomously provisioning and de-provisioning resources, so that at each point in time, the available resources match the current service demand as closely as possible. The advantages of using service elasticity mechanisms are twofold. On the one hand, service elasticity provides Quality of Service (QoS) to the users, which can be expressed using different service metrics, such as response time, throughput (e.g., requests/s), service availability, and so on, depending on the service type. For example, the QoS levels agreed between the service provider and user are defined by means of Service Level Agreements (SLAs), in such a way that service level failures can result in costly penalties for the service provider and a potential loss of clients. On the other hand, service elasticity enables power consumption to be reduced by avoiding resource over-provisioning. Over-provisioning is a typical and simple solution adopted by many service providers to satisfy peak demand periods and guarantee QoS during the service life. However, this results in a waste of resources that remain idle most of the time, with the consequent superfluous power consumption and $CO_2$ emissions. The use of service elasticity mechanisms enables a reduction in the number of resources needed to implement the service and, along with other efficient techniques for server consolidation, virtual machine allocation, and virtual machine migration, it can lead to energy savings for the data center or cloud provider.

Service elasticity can be implemented by using auto-scaling techniques. These make automated scaling decisions based on the value of specific performance metrics, such as hardware metrics (e.g., CPU or memory usage) or service metrics (e.g., queue length, service throughput, response time, etc.). Auto-scaling mechanisms can be classified as reactive and proactive. Reactive mechanisms are continuously monitoring the system and trigger a particular scaling action when a specific condition is met (e.g., provisioning or removing a given number of resources when a particular metric is higher or lower than a specific threshold). The main problem with reactive mechanisms is that the reaction time (time elapsed from the detection of the trigger condition until the resources are ready for use) can be insufficient to avoid the overloading of the system; furthermore, these mechanisms can cause system instability due to the continuous fluctuation of allocated resources. In contrast, proactive (or predictive) mechanisms try to predict the number of resources needed during the next time period, based on statistical or mathematical models of observed workloads and system metrics.

Accordingly, it is desirable to provide a framework for proactive performance testing, which is capable of testing server configurations prior to server app launches and on-going executions. In addition, it is desirable to automate performance testing by gathering metrics of virtual end-to-end scenarios of server use-cases, transactions, and requests and further gather performance metrics of each server eco-systems and technology layer for such processes enabling a holistic performance measurement of the metrics of the processes of a particular server configuration.

It is desirable to integrate the server configuration performance measuring testing with server app development life cycle so developers can collect measuring metrics when modifying features and resources of server configurations in development.

It is desirable to provide automation tools that do not require manual or developer intervention to perform the performance measuring and testing, rather which provide automated actions for individual apps and feature developers to analyze performance in a chosen use case during the development cycle. In addition, when load testing, it is desirable to have one implementation that provides a cross-platform and another that provides a cross-device framework for scalable and fully automated mobile, server, and network performance testing.

It is desirable to use a multi-tenant cloud-based architecture integrated with the automated app performance and testing to improve collaboration, integration, and community-based cooperation between agents within tenant organizations without sacrificing data security. Multi-tenancy refers to a system where a single hardware and software platform simultaneously supports multiple user groups (also referred to as "organizations" or "tenants") from a common data storage element (also referred to as a "multi-tenant database").

The multi-tenant design provides a number of advantages over conventional server virtualization systems. First, the multi-tenant platform operator can often make improvements to the platform based upon collective information from the entire tenant community. Additionally, because all users in the multi-tenant environment execute apps within a common processing space, it is relatively easy to grant or deny access to specific sets of data for any user within the multi-tenant platform, thereby improving collaboration and integration between apps and the data managed by the various apps. The multi-tenant architecture, therefore, allows convenient and cost-effective sharing of similar app features between multiple sets of users.

Embodiments of the subject matter described herein generally relate to systems and methods for measuring the cost of cloud applications using application use-case scenarios for optimum app servers, databases optimum app servers, databases, storage, network and additional services configurations and for orchestrating load tests in use case scenarios for server configurations to model cost metrics from a plurality of use-case scenarios of app servers, database servers, load balancers, and network servers.

As described in greater detail below, primarily in the context of FIG. 1 in exemplary embodiments, app servers and database servers support a desired configured server's performance tracking. In this regard, for each server of the server configuration responds to requests by a server app (i.e. hosted by the app server or in the cloud) for a performance monitoring API that receives the identifier assigned to that server request and then tracks the amount of time or other performance metrics associated with the server processing and responding to the server request, such as, for example, the elapsed time between initiating processing of the request and transmitting a response back to a client application at the client device, alternatively referred to herein as the server processing time (SPT). The performance monitoring API stores or otherwise maintains the server performance metrics in association with the respective server requests. In this regard, in exemplary embodiments, after an app server finishes executing a request or at an instance, a virtual app or server app transmits or otherwise provides the performance metrics associated with the various server requests to the performance monitoring API for storage and/or maintenance in association with the server performance metrics. For example, the performance monitoring API may generate a log entry in a database or other data storage element that associates the server performance metrics with the identifier to the corresponding server request, and thereby uniformly formats and maintains the relationships between various server performance metrics for retrospective analysis.

In various exemplary use case scenarios described in the disclosure, by load testing and performance monitoring being distributed among the server sides, the perceived performance degradation by a user on the client-side is reduced by balancing the resources used for performance monitoring relative to overburdening any one of the resources of the server sides. Additionally, having the server sides track performance metrics associated with each server requests provides improved granularity and differentiation between the amount of time attributable to the overall processing versus the amount of time attributable to the server-side processing. The performance monitoring API is also capable of assembling and formatting the performance data in a manner that allows for the performance data to be integrated or incorporated into any number of different database servers for storage or visualizations. In this regard, maintaining associations between server requests and corresponding performance metrics as well as differentiating between client and server-side performance metrics allows for drill-downs into the details of what request, behavior, or actor is the primary contributor to the overall timing.

The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. The subject matter may be implemented in numerous ways, including as a process, an apparatus, a system, a device, a method, a computer-readable medium such as a computer-readable storage medium containing computer-readable instructions or computer program code, or as a computer program product comprising a computer-usable medium having a computer readable program code embodied therein.

The solution provides a framework for cross-platform and cross-device performance testing which virtualizes the topography of a deployed infrastructure and pipeline processing between resources for workload monitoring of requests across apps, servers, and network devices for depicting cost-to-serve metrics, waterfall charts and call tracing costs for development use cases without requiring manual intervention.

When performing rapid app development, there is often required quick testing and support across these clients, devices, and networks. For example, in various use case scenarios, frequent requests depending on the resource topology often result in performance regressions across one or more sets of resources. It is, therefore, necessary to continuously monitor server performance across this complex matrix and optimize server performance.

FIG. 1 depicts an exemplary embodiment of a computing system 100 capable of monitoring performance and testing loads for a server configuration 110 associated with a client device 106 retrieving or otherwise accessing a computer file provided by or on the server configuration 110 communicatively coupled to the client device 106 over a communications network 108. The communications network 108 may be realized as any sort or combination of wired and wireless computer network, a cellular network, a mobile broadband network, a radio network, the Internet, or the like. It should be noted that FIG. 1 is a simplified representation of a computing system 100 for purposes of explanation and is not intended to be limiting. For example, in practice, multiple instances of client devices 106 communicating on the network 108 may be present, with any number of instances of applications being provided by the server 110 to various instances of client devices 106. Additionally, practical implementations may include multiple instances of the server 110 configured with app servers 40, database servers 45, storage 50, network 55, and additional services 60 which, in turn may reside behind or rely on one or more load balancers by a load generator 10 to manage resource utilization, as will be appreciated in the art. Additionally, a processing system 120 runs load tests 15 to measure and produce the CTS metrics 20 as instructed by instructions in memory 122. The processing system 120 uses a processor configured for metric processing 25 and implements various CTS models 30. The results are displayed by an analysis engine 35 that via a user interface can display multiple analytics in a dashboard. For Example, KIBANA® is an open-source data visualization and exploration tool used for log and time-series analytics, application monitoring, and operational intelligence use cases with histograms, line graphs, pie charts, heat maps, and built-in geospatial support and provides tight integration with Elasticsearch.

The server 110 generally represents a computing device, computing system or another combination of processing logic, circuitry, hardware, and/or other components configured to support the processes, tasks, operations, and/or functions described herein. In this regard, the server 110 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein.

The processing system 120 may include or otherwise access a data storage element or memory 122 capable of storing programming instructions for execution by the processing system 120, that, when read and executed, cause processing system 120 to support the processes described herein. Depending on the embodiment, the memory 122 may be realized as random-access memory (RAM), read-only memory (ROM), flash memory, magnetic or optical mass storage, or any other suitable non-transitory short or long-term data storage or other computer-readable media, and/or any suitable combination thereof. In one or more embodiments, the programming instructions cause the processing system 120 to create, generate, or otherwise facilitate an application platform that is capable of supporting, producing, or otherwise providing instances of a virtual application at run-time (or "on-demand") based at least in part upon code and other data that is stored or otherwise maintained in memory 122. In exemplary embodiments, the programming instructions also cause the processing system 120 to create, generate, or otherwise facilitate a performance monitoring and testing application program interface (API) that supports tracking, testing, and otherwise monitoring performance metrics associated with the server configuration 110 monitoring requests between the configured resources of the app servers 40 providing web pages or other files, data, and/or information to the client device 106 as well as requests and sends executed between the app server 40, database servers 45, the storage 50, the network 55 and the additional services 60. Depending on the embodiment, the performance monitoring and testing API can be integrated with or otherwise incorporated as part of a virtual application or be realized as a separate or standalone component that is capable of interacting with the client devices 106, the server configuration 110 resources and any independent virtual applications.

The analysis engine 35 analyses each of the sum totals captured by the capture script. As an exemplary embodiment, for each combination of the above, the analysis engine 35 automatically analyses and trends each performance metrics obtained, thereby capturing any improvement or regression for every server configuration through the application development lifecycle. The analysis engine 35 also provides drill-down analysis, reporting, and dashboards for each of the combination of app server, database server, storage, etc. In an exemplary embodiment, the analysis engine 35 provides breakdown of total request times in each of the different app server layers, the number of app services called, and time is taken for each call; the number of APIs called, and time is taken for each API call; and the number of database server SQL/PLSQL statements executed.

The client device 106 generally represents an electronic device coupled to the network 108 that may be utilized by a user to access the application platform on the app server 40 of the server 110 to thereby access instances of virtual applications supported by the app server 40 and/or retrieve data from the database server 45 via the network 108. In practice, the client device 106 can be realized as any sort of personal computer, mobile telephone, tablet, or other network-enabled electronic devices. In exemplary embodiments, the client device 106 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 106.

Figure 2:
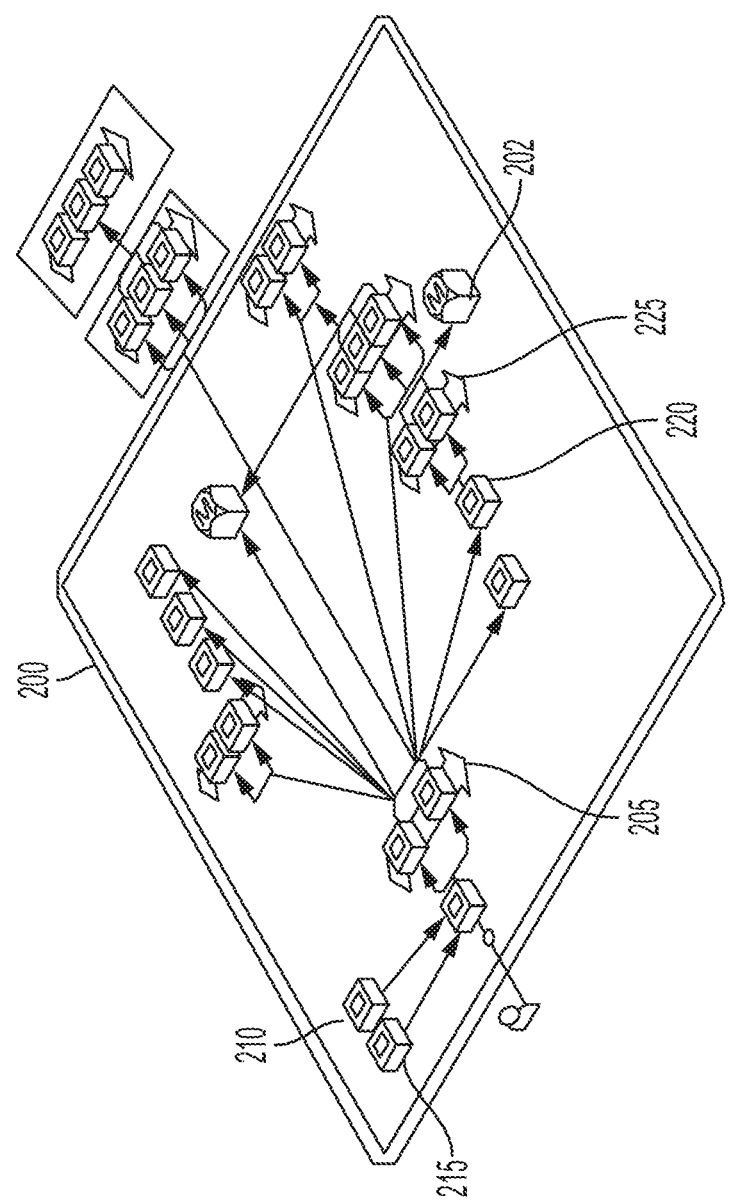
FIG. 2 is a block diagram of a deployment of resources in a pod used for measuring performance and testing run loads in accordance with an embodiment.

With a reference to FIG. 2, FIG. 2 is a diagram of a deployment of resources in a pod in accordance with an embodiment. In FIG. 2, the POD 200 groups together a number of components that share the same DB node 202 with a set of common network and storage resources. The DB node 202 is connected to components of agents 220, app servers 205, load balancers 220, loads 215 and controller 210. The various components are scheduled by the controller 210 and modeled by a variety of open source tools. In an exemplary embodiment, TERRAFORM® is an open source tool that can be used to define the infrastructure by a configuration language a HashiCorp Configuration Language (HCL). With the TERRAFORM® users can write unique HCL configuration files or borrow existing templates from the public module registry for a desired infrastructure configuration. In addition, SPINNAKER® an open source pipeline tool can be used in conjunction to orchestrate the deployment pipeline. It can be deployed across multiple cloud providers including AWS EC2, Kubernetes, Google Compute Engine, Google Kubernetes Engine, Google App Engine, Microsoft Azure, Open stack, Cloud Foundry, and Oracle Cloud Infrastructure. The pipeline in Spinnaker consists of a sequence of actions or stages that can be instigated manually, or can be configured to automatically be triggered by an event, or a stage in another pipeline and SPINNAKER® can sequence stages such as Deploy, Resize, Disable, Manual Judgment, etc.

Figure 3:
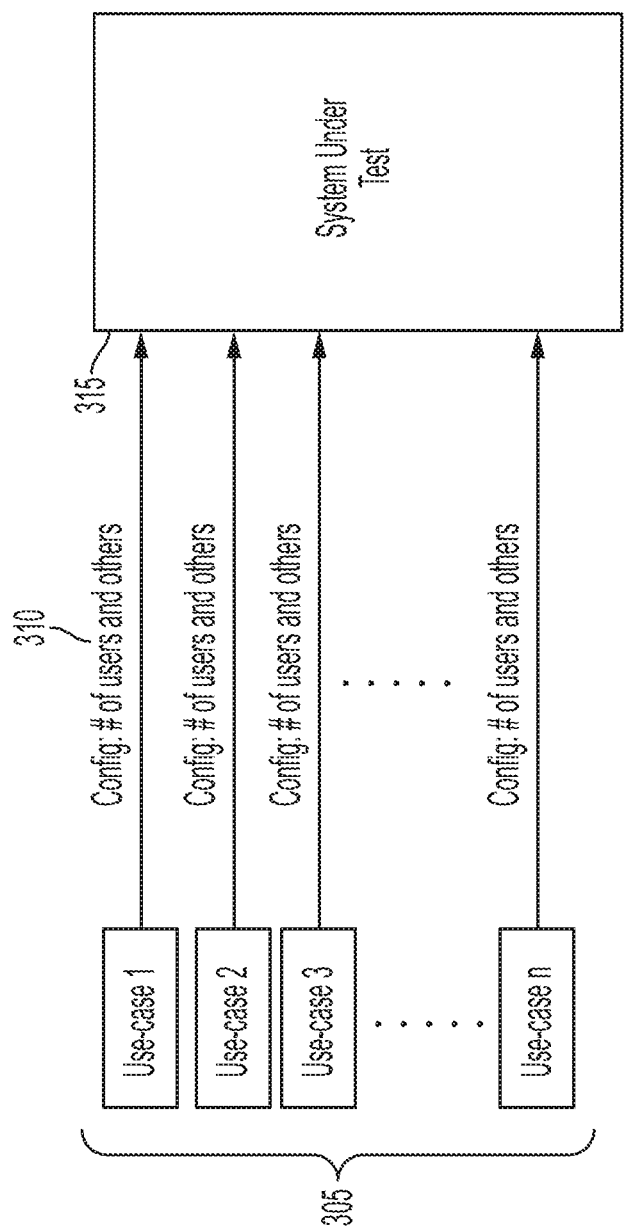
FIG. 3 is a diagram of use-cases configured with a number of users and others under a system test in accordance with an embodiment.
Figure 4:
FIG. 4 is an exemplary screenshot of a graphic user interface displaying the measured total costs for a virtual pod of a particular use case scenario in accordance with an embodiment.

FIG. 3 is a diagram of use-cases configured with a number of users and others under a system test in accordance with an embodiment. In FIG. 3, use cases 305 include a set of use-cases (1 . . . n) that are each configured with a number of users for a system under test 315. That is the system under test 315 can be considered a deployment of resources in a pipeline processing configuration that is supporting a particular number of users and others for a series of use cases 305. The load testing can be performed with configurable customization and concurrency for a customized load testing workload using any combination of use-case scenarios. For example, an exemplary use cases for a use—Sales persona scenario would include the steps of the user→Login→and then Going to Opportunity List View→, then Viewing an Opportunity Record→then, Logging into a Call→, then Modifying the Amount→then saving→and finally Logging out. The performance of each resource or sets of resources in the POD for this use case scenario can be analyzed. Further, multiple use-case scenarios can be combined into a single workload and each use-case scenario can have configurable number of users concurrently hitting the system under test FIG. 4 is an exemplary screenshot of a graphic user interface displaying the measured total costs for a virtual pod of a particular use case scenario in accordance with an embodiment. In FIG. 4, in an exemplary embodiment a probabilistic approach is implemented to determine the cost of the deployed infrastructure based on existing cost models. The total cost is calculated from the sum of the compute costs, storage costs and network costs. In FIG. 4, the compute costs 405 include costs for the app 410, the database node 415, the broker 420, the zookeeper 425, and the load balancer 430. The costs are determined at the host web service rate of $0.80 and for a weekly cost. The other costs are the storage costs 435 which are the GB/month used at the host web service rate of 0.07. Finally, the networking costs 450 are determined for a the router company licensing costs and the provisioning costs.

Figure 5:
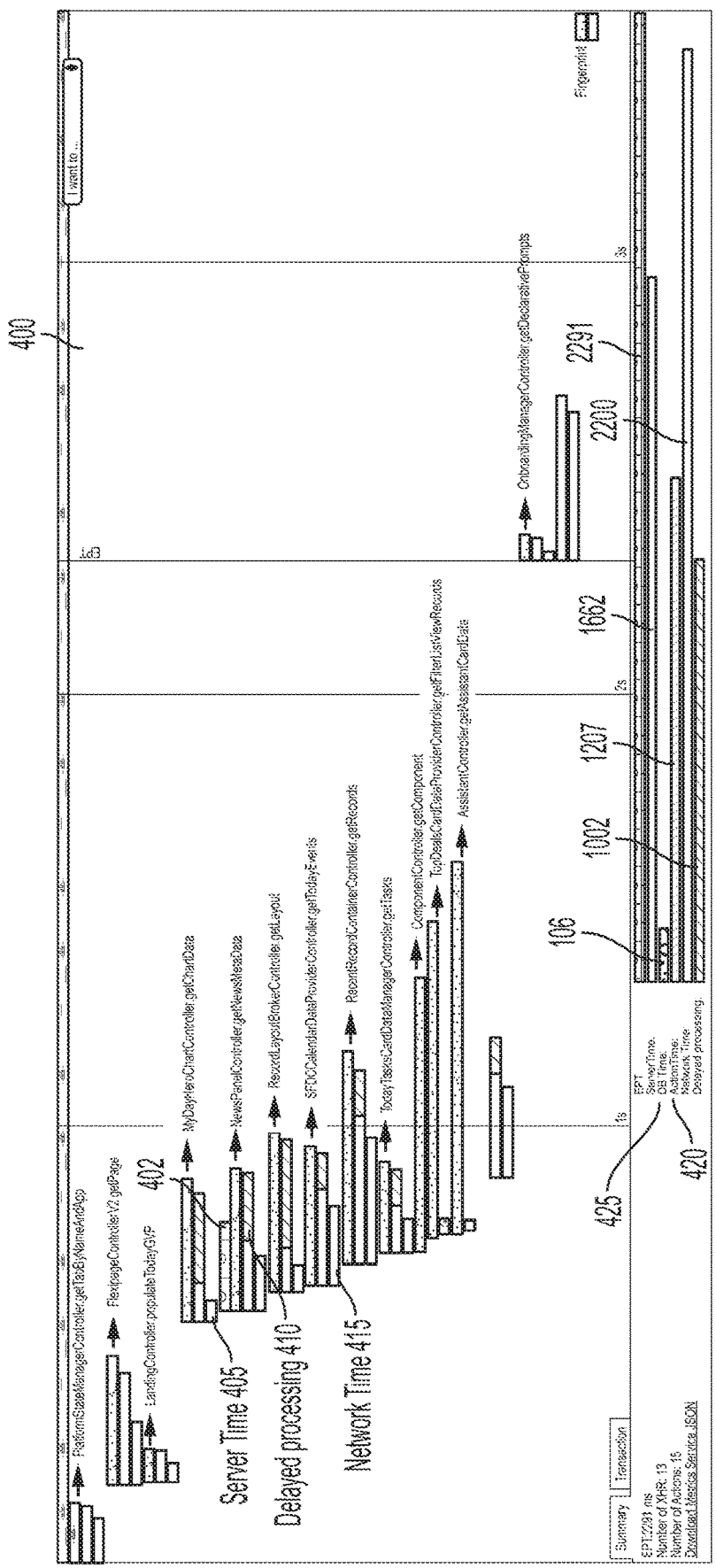
FIG. 5 is an exemplary waterfall diagram of server calls per page and distributed costs for each server call and associated time in each layer in accordance with an embodiment.

FIG. 5 is an exemplary waterfall diagram of server calls per page and distributed costs for each server call and associated time in each layer in accordance with an embodiment. In FIG. 5, the waterfall chart 500 illustrates the collecting of performance metrics for the client and server transactions. The Experienced Page Time (EPT) 502 which is the measured page load time is compared and affected by the delayed processing 510, the server time 505, the network time 515, the action time 520 and the database (DB) time 525. The EPT is measured as the time from the Page Start on which no more activity has occurred for at least two frames (~33 ms). The measured attributes are related to the component implementation details, errors, and caching which can all negatively impact EPT. There are also external factors like network quality, browser performance, and user interactions with the page while it is loading. The exemplary waterfall chart 500 assists a user to analyze server calls per page and distributed costs for each server call and associated time at each layer (e.g. total server time, API time, database time, etc.).

Figure 6:
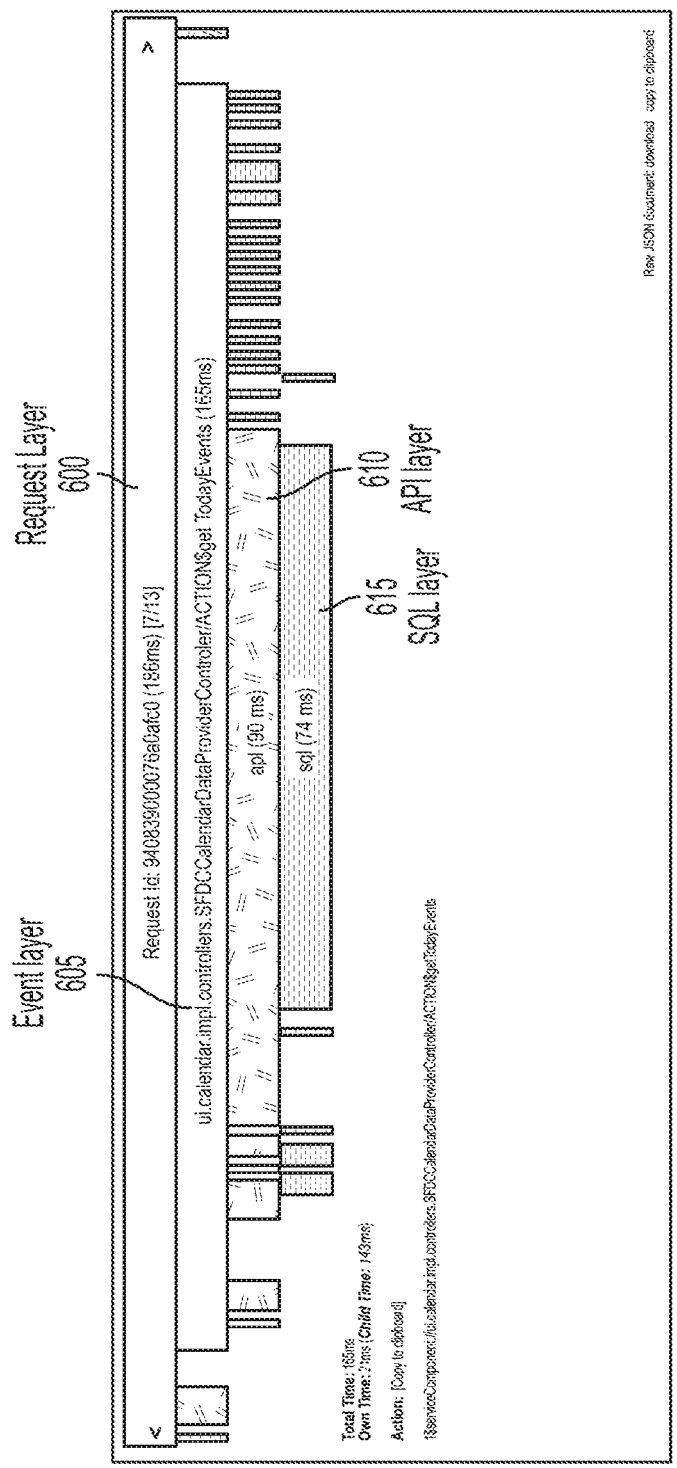
FIG. 6 illustrates a diagram of each server call which is distributed tracing to determine cost at each layer of the infrastructure, in accordance with an embodiment.
Figure 7:
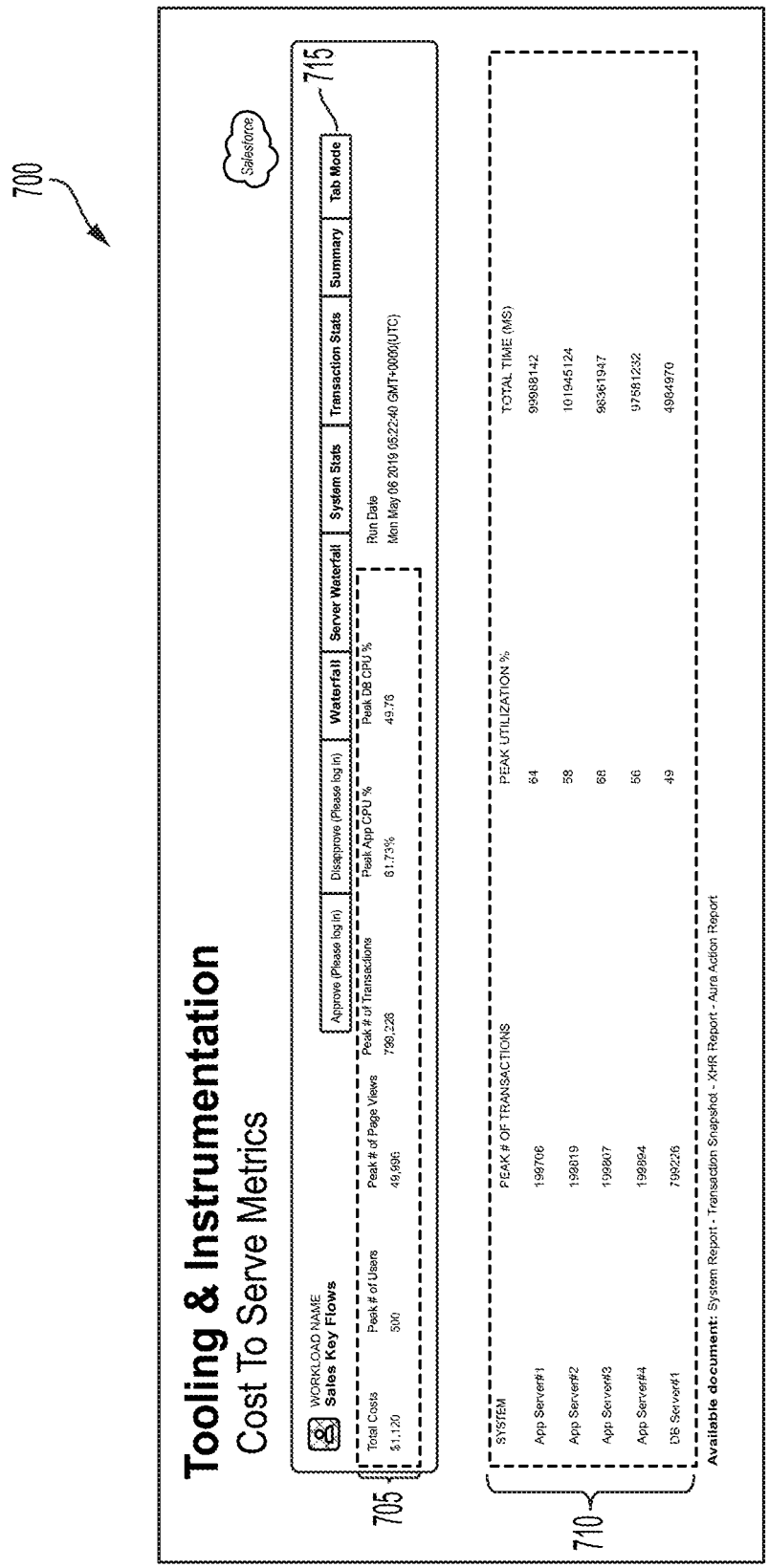
FIG. 7 illustrates an exemplary diagram of performance metrics statistics for system utilization at peak loads and cost metrics based on system utilization in accordance with an embodiment.

FIG. 6 illustrates a diagram of each server call which is distributed tracing to determine cost at each layer of the infrastructure, in accordance with an embodiment. FIG. 6 is a waterfall graph of instrumentation time for event logs of an exemplary method for performance testing is a screenshot of a workload of an exemplary method of a cost-to-serve system for measuring performance and testing run loads for server configurations containing app servers, databases, storage devices, networks and additional services in accordance with an embodiment. That is FIG. 7 illustrates in waterfall graph 700 event logging and processing time for events at the client, server, and network. The waterfall graph 700 enables an app developer to visually monitor processing at different instances requests, calls, and events of an app server, database server, network, and other resources in server configurations. For example, an event may be processed faster at the server versus the network. There may be bottlenecks discerned at the network due to bandwidth allocation or under used resources in a particular server configuration. In any event, by visually viewing the processing times of the resources in the server configuration when executing load testing amounts of processing required each resource, problem areas can be easily discovered. In an exemplary embodiment, the delay time can be compared with the server time and network time. Hence, app servers and database server's execution time across the server configuration and the network can easily be assessed. Moreover, in a multi-tenant environment, resource sharing requires balancing app server performance and processing capabilities of the instrumentations. Therefore, by visually indicating in a waterfall graph as lengths of processing times, processing times of instrumentations are easily understood during app development.

FIG. 7 illustrates an exemplary diagram of performance metrics statistics for system utilization at peak loads and cost metrics based on system utilization in accordance with an embodiment. FIG. 7 is a graphic user interface (GUI) 700 displaying a screenshot of a workload of an exemplary method of a cost-to-serve system for measuring performance and testing run loads for server configurations containing app servers, databases, storage devices, networks, and additional services in accordance with an embodiment. The graphic user interface GUI 700 shown in the screen shot of a "Sales Key Flow." In Block 705, information of the "total cost," "peek # of users," "peek # of page views," "peek # of transactions," "peek app CPU %," and "peek DB CPU %" are shown for a particular run date. Additionally, tab mode 715, enable different information chart displays of a "waterfall," "server waterfall," "transaction stats," and "summary." The user selects the type of display desired. In Block 710, stats of the various app servers 1 to 5 and a DB server are displayed in a manner for comparisons between each other. The server performance metrics captured may include peak number of transactions, peak utilization percentage and total time (i.e. total server processing time) for each server.

By selecting a different tab mode 715, other metrics can be displayed such as time component metrics for each server configuration and include "runtime", "CPU time", "Db total time", "DB CPU time", "Cache time", and "Db Connection Checkout Time". It is contemplated that a variety of different server configuration stats and data can be presented in a plethora of ways as desired by the user, and presentation in FIG. 7 should not be construed as limiting. For example, in various exemplary embodiments, different presentations can be configured by the SALESFORCE® LIGHTNING™. That is, the SALESFORCE® LIGHTNING enables a user to use navigation tools through pages to customize displays for various types of users and show database and server processing time and network processing time metrics generated and captured for detailed monitoring.

FIGS. 8a and 8b illustrate an exemplary diagram of iterative tests with increasing concurrency to determine optimal cost-to-serve service in accordance with an embodiment. In FIGS. 8a and 8b, charts 805 and 810 are configured and displayed to enable a user to analyze the performance and cost metrics, to determine areas for cost optimizations based on previous test runs and repeat the process for a different (i.e. more optimal) server configuration and load characteristics. Further, the charts 805 and 810 provide insight to the user to exit a particular use case scenario if further optimization is not viable and provide performance and cost metrics analysis via analytics dashboards. In addition, the charts show with an increase in users, an increase in memory and an increase in percentage of CPU time while the hourly cost-to-serve each user is decrease. However, certain resources in a particular POD are fixed and cannot be expanded. Hence, if the number of users exceeded the processing throughput of certain fixed resources in a POD then the latency times, CPU processing times etc. are increased and the configuration is no longer able to perform at an optimum performance level. The cost metrics is an indicator to the user, as example to justify additional parallel processing configurations of PODs with similar resources. In other words, there is a balance between performance, costs and loads that can be discerned from the charts 805 and 810.

Figure 9:
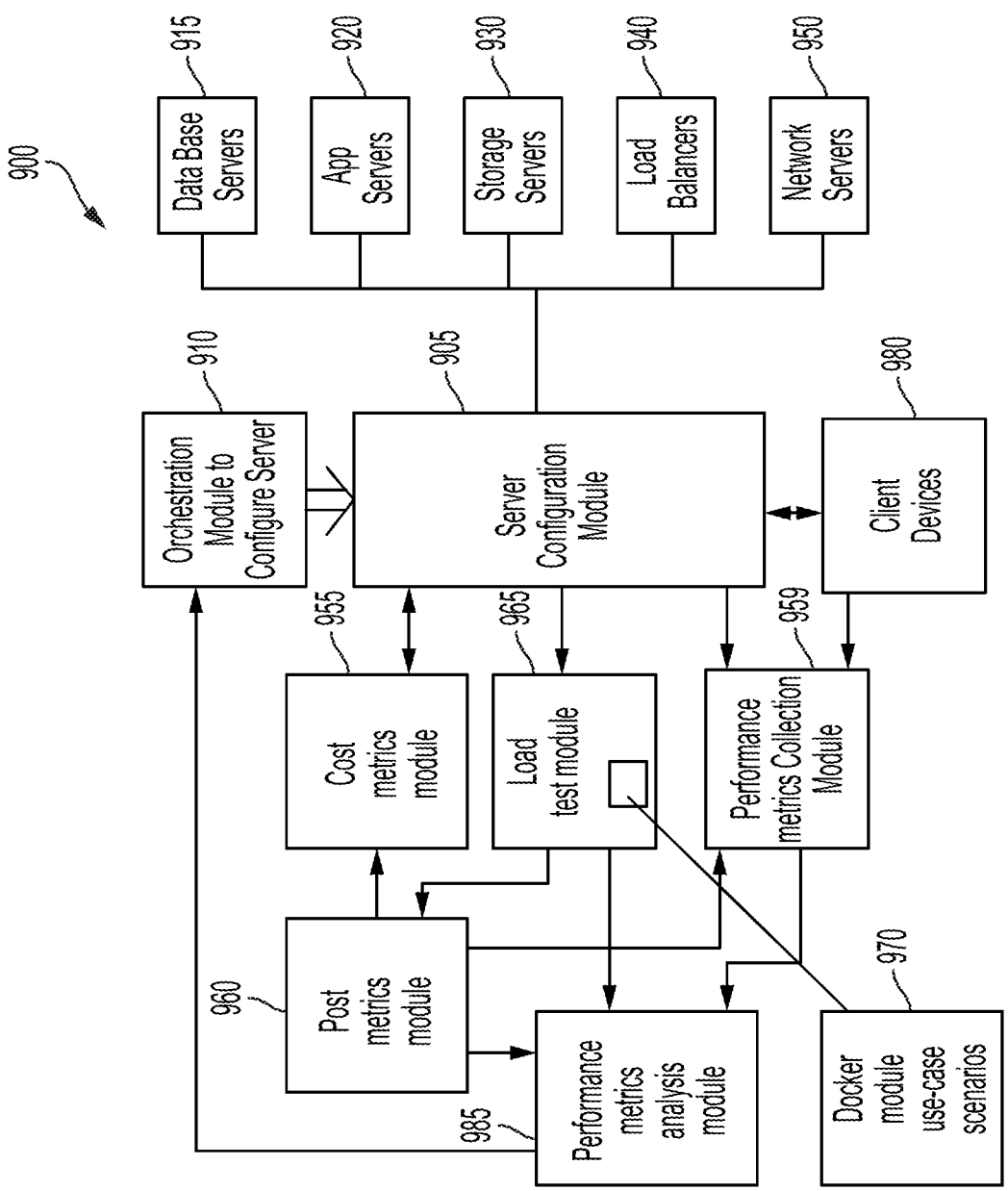
FIG. 9 is a functional diagram illustrating an automated system for testing and measuring performance for use-case scenario cost analysis of cloud applications in accordance with an embodiment.

With reference to FIG. 9, FIG. 9 is a functional diagram illustrating an automated system for testing and measuring performance for use-case scenario cost analysis of cloud applications in accordance with an embodiment. In FIG. 9, the automated performance and cost measurement system 900 measures the cost of cloud applications using application use-case scenarios by implementing a set of a process configured modules to perform metric analysis, load tests, cost metrics, server configuration, and metric collections of various use case scenarios. In FIG. 9, a server configuration is generated for a server configuration module 905 by an orchestration module 910. The orchestration module 910 receives input data that has been analyzed by a performance metric analysis module 985 to put forth a particular arrangement to configure the server. That is, configuration data from the orchestration module 910 based on the performance metrics analysis is generated in real-time to provide an elastic server configuration with a set of resources selected by the orchestration module 910 and implemented by the server configuration module 905. The orchestration module 910 orchestrates a load test from a plurality of use-case scenarios with a desired concurrency of simulated users to determine a particular server configuration for implementation by the server configuration module 905. For example, the server configuration module 905 selects a quantity and types of database servers 915, app servers 920, storage servers 930, load balancers 940 and network servers 950 to a desired server configuration which can be modified based in part on results from a load test module 965 with sub-modules 970 to configure plurality of docker containers each running a single instance of dockerized. Docker works by providing a standard way to run your code. Docker is an operating system for containers. Similar to how a virtual machine virtualizes (removes the need to directly manage) server hardware, containers virtualize the operating system of a server. Docker is installed on each server and provides simple commands you can use to build, start, or stop containers. The performance metrics analysis module 985 receives data from a post metric module 960 to model cost metrics of the deployed server configuration from metrics data collected by the performance metrics collection module 975 on the app servers 920, database servers 915, storage servers 930, network servers 950, load balancers 940 and the client devices 980. The post metrics module 960 generates metrics to the cost metrics module 955 from data from the load test module 965 by post-process metrics analysis across the load testing duration to provide performance and cost metrics.

The performance metric analysis module 985 analyzes the performance metrics received from the post metric module 960 to determine areas for cost optimizations based on heuristics and in various exemplary embodiments can repeat the above analysis process for a different (i.e. or a more optimal) server configuration and associated load characteristics. At an optimal stage or when additional testing yields insignificant or no improvements, the performance metric analysis module 985 can be programmed to not proceed with further testing and analysis. In other words, if further optimization is not viable, then the performance metric analysis module 985 provides the current performance and cost metrics results for use and for display via analytics dashboards.

The app server 920 can be configured as a platform as a service ("Paas") that provides a host of features to develop, test, deploy, host and maintain-apps in the same integrated development environment of the app platform. Additionally, the app server 920 may be part of a multi-tenant architecture where multiple concurrent users utilize the same development apps installed on the app platform. Also, by utilizing the multi-tenant architecture in conjunction with the app platform integration with web services and databases via common standards and communication tools can be configured. As an example, SALESFORCE SERVICECLOUD® is an app platform residing on the app server may host all the varying services needed to fulfill the app development process. The SALESFORCE SERVICECLOUD®, as an example, may provide web-based user interface creation tools to help to create, modify, test, and deploy different UI scenarios.

The app platform includes apps relating to APIs and objects. The app platform may include other apps in communication for accessing a multi-tenant database as an example, in a multi-tenant database system.

Additionally, a call or request is from an app server controller by an action initiated by a client controller. In a client controller, a callback is set, which is called after the server action is completed.

Additionally, the app platform has access to other databases for information retrieval and include a local database where local performance metric data may be stored. The local database may be part of the multi-tenant database architecture allowing for communication with multi-tenant database. In addition, the app platform can access a multi-tenant database which is part of the multi-tenant architecture. The multi-tenant database allows for enterprise customer access and the app platform may be given access to the multi-tenant database dependent upon differing factors such as an associated session ID associated.

Figure 10:
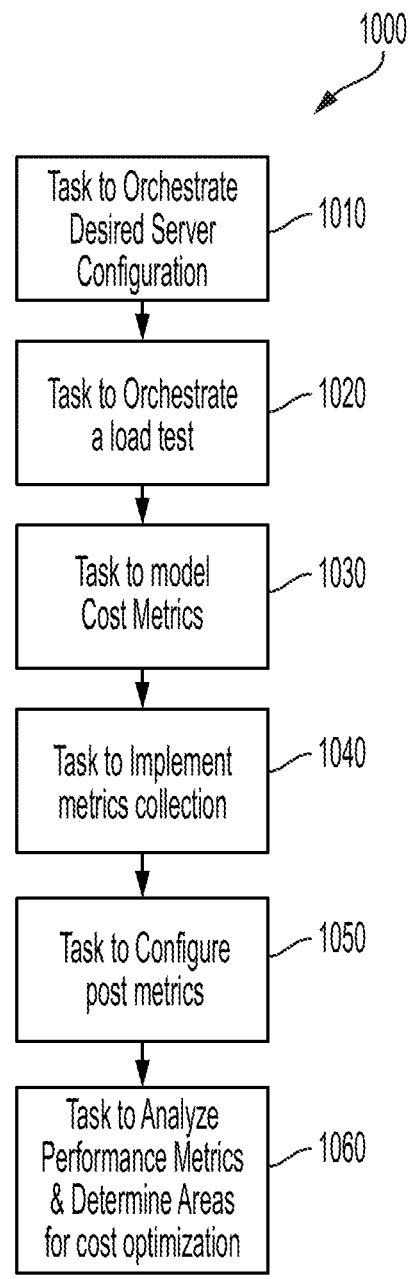
FIG. 10 is a flow chart of an exemplary method for automatically testing performance for the desired server configuration in accordance with an embodiment.

With reference to FIG. 10, FIG. 10 is a flow chart of an exemplary method 1000 for automatically testing performance for the desired server configuration in accordance with an embodiment. More particularly, the exemplary method 1000 includes: Configuring a first module to orchestrate a desired server configuration (Task 1010) of a set of resources of app servers, database servers, storage servers, load balancers, network servers; configuring (Task 1020) a second module orchestrate a load test for a configuration of a plurality of servers, load balances and other resources executing a cloud app for a particular database server node in which the resources are elastically configured in real time: configuring (Task 1030) a third module to model a set of cost metrics for the desired server configuration; configuring (Task 1040) a fourth module to implement a collection of metrics relating to the performance and testing by the load test or from ongoing performance of a desired or actual server configuration; configuring (Task 1050) a fifth module to implement a post metric analysis across the loading testing duration and provide performance and cost metric; and configuring (Task 1060) a fifth module to analyze the perform metrics, determine areas for cost optimizations based on heuristics and repeat the prior tasks 1010 to 1050 for different optimum or desired server configurations and load characteristics; and to end the process when it is determined that further optimization is not a viable alternative or under other pre-set or threshold conditions. The method 1000 may also include recording and displaying performance data associated with operations of the desired or optimized server configurations.

Figure 11:
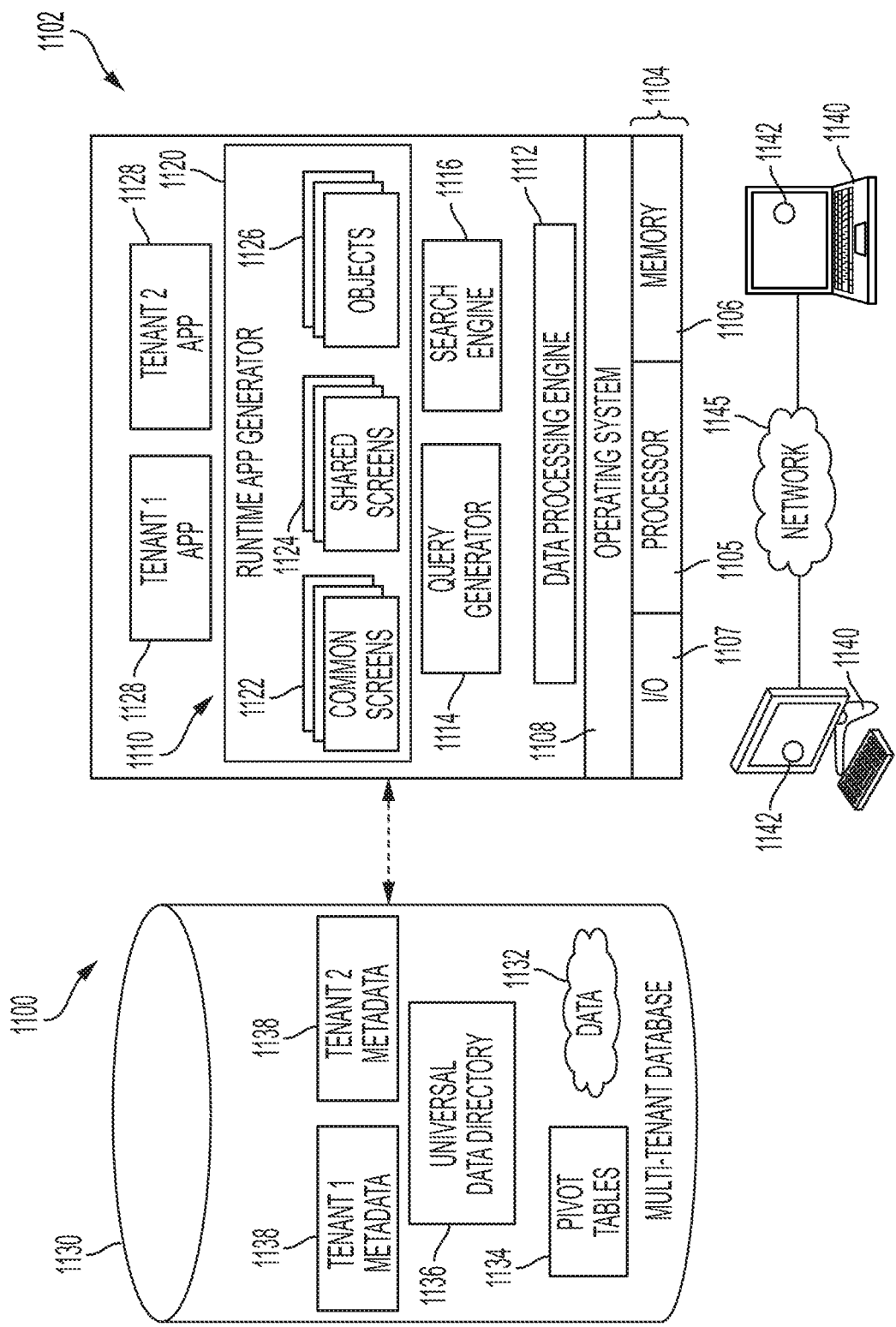
FIG. 11 is a schematic block diagram of a multi-tenant computing environment in accordance with an embodiment.

With reference to FIG. 11, FIG. 11 is a schematic block diagram of a multi-tenant computing environment in accordance with an embodiment. FIG. 11 is a schematic block diagram of a multi-tenant computing environment for use in conjunction with the communication process of the object sharing of the mobile client and agent in accordance with an embodiment. A server may be shared between multiple tenants, organizations, or enterprises, referred to herein as a multi-tenant database. In the exemplary disclosure, video-chat data and services generated by are provided via a network 1145 to any number of tenant devices 1140, such as desktops, laptops, tablets, smartphones, Google Glass™, and any other computing device implemented in an automobile, aircraft, television, or other business or consumer electronic device or system, including web tenants.

Each app 1128 is suitably generated at run-time (or on-demand) using a common type of app platform 1110 that securely provides access to the data 1132 in the multi-tenant database 1130 for each of the various tenant organizations subscribing to the service cloud 1100. In accordance with one non-limiting example, the service cloud 1100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 1130. In this regard, each tenant includes one or more users and/or groups associated with, authorized by, or otherwise belonging to that respective tenant. Stated another way, each respective user within the multi-tenant system of the service cloud 1100 is associated with, assigned to, or otherwise belongs to a particular one of the plurality of enterprises supported by the system of the service cloud 1100.

Each enterprise tenant may represent a company, corporate department, business or legal organization, and/or any other entities that maintain data for particular sets of users (such as their respective employees or customers) within the multi-tenant system of the service cloud 1100. Although multiple tenants may share access to the server 1102 and the multi-tenant database 1130, the particular data and services provided from the server 1102 to each tenant can be securely isolated from those provided to other tenants. The multi-tenant architecture therefore allows different sets of users to share functionality and hardware resources without necessarily sharing any of the data 1132 belonging to or otherwise associated with other organizations.

The multi-tenant database 1130 may be a repository or other data storage system capable of storing and managing the data 1132 associated with any number of tenant organizations. The multi-tenant database 1130 may be implemented using conventional database server hardware. In various embodiments, the multi-tenant database 1130 shares the processing hardware 1104 with the server 1102. In other embodiments, the multi-tenant database 1130 is implemented using separate physical and/or virtual database server hardware that communicates with the server 1102 to perform the various functions described herein.

In an exemplary embodiment, the multi-tenant database 1130 includes a database management system or other equivalent software capable of determining an optimal query plan for retrieving and providing a particular subset of the data 1132 to an instance of app (or virtual app) 1128 in response to a query initiated or otherwise provided by an app 1128, as described in greater detail below. The multi-tenant database 1130 may alternatively be referred to herein as an on-demand database, in that the multi-tenant database 1130 provides (or is available to provide) data at run-time to on-demand virtual apps 1128 generated by the app platform 1110, as described in greater detail below.

In practice, the data 1132 may be organized and formatted in any manner to support the app platform 1110. In various embodiments, the data 1132 is suitably organized into a relatively small number of large data tables to maintain a semi-amorphous "heap"-type format. The data 1132 can then be organized as needed for a particular virtual app 1128. In various embodiments, conventional data relationships are established using any number of pivot tables 1134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 1136, for example, can be used to describe any number of forms, reports, workflows, user access privileges, business logic and other constructs that are common to multiple tenants.

Tenant-specific formatting, functions, and other constructs may be maintained as tenant-specific metadata 1138 for each tenant, as desired. Rather than forcing the data 1132 into an inflexible global structure that is common to all tenants and apps, the multi-tenant database 1130 is organized to be relatively amorphous, with the pivot tables 1134 and the metadata 1138 providing additional structure on an as-needed basis. To that end, the app platform 1110 suitably uses the pivot tables 1134 and/or the metadata 1138 to generate "virtual" components of the virtual apps 1128 to obtain, process logically, and present the relatively amorphous data from the multi-tenant database 1130.

The server 1102 may be implemented using one or more actual and/or virtual computing systems that collectively provide the dynamic type of app platform 1110 for generating the virtual apps 1128. For example, the server 1102 may be implemented using a cluster of actual and/or virtual servers operating in conjunction with each other, typically in association with conventional network communications, cluster management, load balancing and other features as appropriate. The server 1102 operates with any sort of processing hardware 1104 which is conventional, such as a processor 1105, memory 1106, input/output features 1112 and the like. The input/output features 1112 generally represent the interface(s) to networks (e.g., to the network 1145, or any other local area, wide area or other network), mass storage, display devices, data entry devices and/or the like. The processor 1105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1106 represents any non-transitory short- or long-term storage or other computer-readable media capable of storing programming instructions for execution on the processor 1105, including any sort of random-access memory (RAM), read only memory (ROM), flash memory, magnetic or optical mass storage, and/or the like. The computer-executable programming instructions, when read and executed by the server 1102 and/or processor 1105, cause the server 1102 and/or processor 1105 to create, generate, or otherwise facilitate the app platform 1110 and/or virtual apps 1128 and perform one or more additional tasks, operations, functions, and/or processes described herein. It should be noted that the memory 1106 represents one suitable implementation of such computer-readable media, and alternatively or additionally, the server 1102 could receive and cooperate with external computer-readable media that is realized as a portable or mobile component or platform, e.g., a portable hard drive, a USB flash drive, an optical disc, or the like.

The app platform 1110 is any sort of software app or other data processing engine that generates the virtual apps 1128 that provide data and/or services to the tenant devices 1140. In a typical embodiment, the app platform 1110 gains access to processing resources, communications interface and other features of the processing hardware 1104 using any sort of conventional or proprietary operating system 1108. The virtual apps 1128 are typically generated at run-time in response to input received from the tenant devices 1140. For the illustrated embodiment, the app platform 1110 includes a bulk data processing engine 1112, a query generator 1114, a search engine 1116 that provides text indexing and other search functionality, and a runtime app generator 1120. Each of these features may be implemented as a separate process or other module, and many equivalent embodiments could include different and/or additional features, components or other modules as desired.

The runtime app generator 1120 dynamically builds and executes the virtual apps 1128 in response to specific requests received from the tenant devices 1140. The virtual apps 1128 are typically constructed in accordance with the tenant-specific metadata 1138, which describes the particular tables, reports, interfaces, and/or other features of the particular app 1128. In various embodiments, each virtual app 1128 generates dynamic web content that can be served to a browser or other tenant program 1142 associated with its tenant device 1140, as appropriate.

The runtime app generator 1120 suitably interacts with the query generator 1114 to efficiently obtain data 1132 from the multi-tenant database 1130 as needed in response to input queries initiated or otherwise provided by users of the tenant devices 1140. In a typical embodiment, the query generator 1114 considers the identity of the user requesting a particular function (along with the user's associated tenant), and then builds and executes queries to the multi-tenant database 1130 using system-wide metadata 1136, tenant-specific metadata, pivot tables 1134, and/or any other available resources. The query generator 1114 in this example, therefore, maintains the security of the common database by ensuring that queries are consistent with access privileges granted to the user and/or tenant that initiated the request.

With continued reference to FIG. 11, the bulk data processing engine 1112 performs bulk processing operations on the data 1132 such as uploads or downloads, updates, online transaction processing, and/or the like. In many embodiments, less urgent bulk processing of the data 1132 can be scheduled to occur as processing resources become available, thereby giving priority to more urgent data processing by the query generator 1114, the search engine 1116, the virtual apps 1128, etc.

In exemplary embodiments, the app platform 1110 is utilized to create and/or generate data-driven virtual apps 1128 for the tenants that they support. Such virtual apps 1128 may make use of interface features such as custom (or tenant-specific) screens 1124, standard (or universal) screens 1122 or the like. Any number of custom and/or standard objects 1126 may also be available for integration into tenant-developed virtual apps 1128. As used herein, "custom" should be understood as meaning that a respective object or app is tenant-specific (e.g., only available to users associated with a particular tenant in the multi-tenant system) or user-specific (e.g., only available to a particular subset of users within the multi-tenant system), whereas "standard" or "universal" apps or objects are available across multiple tenants in the multi-tenant system.

The data 1132 associated with each virtual app 1128 is provided to the multi-tenant database 1130, as appropriate, and stored until it is requested or is otherwise needed, along with the metadata 1138 that describes the particular features (e.g., reports, tables, functions, objects, fields, formulas, code, etc.) of that particular virtual app 1128. For example, a virtual app 1128 may include a number of objects 1126 accessible to a tenant, wherein for each object 1126 accessible to the tenant, information pertaining to its object type along with values for various fields associated with that respective object type are maintained as metadata 1138 in the multi-tenant database 1130. In this regard, the object type defines the structure (e.g., the formatting, functions and other constructs) of each respective object 1126 and the various fields associated therewith.

Still referring to FIG. 11, the data and services provided by the server 1102 can be retrieved using any sort of personal computer, mobile telephone, tablet or other network-enabled tenant device 1140 on the network 1145. In an exemplary embodiment, the tenant device 1140 includes a display device, such as a monitor, screen, or another conventional electronic display capable of graphically presenting data and/or information retrieved from the multi-tenant database 1130, as described in greater detail below.

Typically, the user operates a conventional browser app or other tenant program 1142 executed by the tenant device 1140 to contact the server 1102 via the network 1145 using a networking protocol, such as the hypertext transport protocol (HTTP) or the like. The user typically authenticates his or her identity to the server 1102 to obtain a session identifier ("Session ID") that identifies the user in subsequent communications with the server 1102. When the identified user requests access to a virtual app 1128, the runtime app generator 1120 suitably creates the app at run time based upon the metadata 1138, as appropriate. However, if a user chooses to manually upload an updated file (through either the web-based user interface or through an API), it will also be shared automatically with all of the users/devices that are designated for sharing.

As noted above, the virtual app 1128 may contain Java, ActiveX, or other content that can be presented using conventional tenant software running on the tenant device 1140; other embodiments may simply provide dynamic web or other content that can be presented and viewed by the user, as desired. As described in greater detail below, the query generator 1114 suitably obtains the requested subsets of data 1132 from the multi-tenant database 1130 as needed to populate the tables, reports or other features of the particular virtual app 1128. In various embodiments, app 1128 embodies the functionality of an interactive performance review template linked to a database of performance and testing metrics, as described below in connection with FIGS. 1-11.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various tasks performed in connection with performance metric monitoring may be performed by software, hardware, firmware, or any combination thereof. For illustrative purposes, the following description of object capture, shared display, and process may refer to elements mentioned above in connection with FIGS. 1-11. In practice, portions of process of FIGS. 1-11 may be performed by different elements of the described system, e.g., mobile clients, agents, in-app apps, etc. It should be appreciated that process of FIGS. 1-11 may include any number of additional or alternative tasks, the tasks are shown in FIGS. 1-11 need not be performed in the illustrated order, and process of the FIGS. 1-11 may be incorporated into a more comprehensive procedure or process having additional functionality not described in detail herein. Moreover, one or more of the tasks shown in FIG. 1-11 could be omitted from an embodiment of the process shown in FIGS. 1-11 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An elastic cost-to-serve (CTS) system implementing use-case scenarios of load testing and measuring server performance metrics of a configured server set to balance in real time per user costs with processing capacity of each server or resource, comprising:
    a first module to deploy a pod of a plurality of resources comprising at least an app server, a database server, a storage server, a load balancer, and a network;
    a second module coupled to the first module to orchestrate a load test and to apply one or more use-case scenarios for each deployed pod with a selected number of simulated users, and further comprising a sub-module to apply one or more docker containers to execute a single instance of a virtual docker application to simulate the one or more use case scenarios;
    a third module coupled to the second module to generate a cost metrics model of an orchestrated server set for predictive CTS modeling of the orchestrated server set;
    a fourth module coupled to the third module to collect a plurality of performance metrics across server resources and associated client devices;
    a fifth module coupled to the fourth module to post-process a set of collected performance metrics across a load testing duration and to provide analytics of a pod performance; and
    a sixth module coupled to the fifth module to analyze a set of performance metrics adapting available resources and to apply a heuristic of the cost metrics model with use of the set of collected performance metrics to predict a model of cost optimization of the pod and to determine whether to repeat one or more steps by the first to fifth modules to reach a further optimized deployed set of resources for the pod.

2. The system of claim 1, further comprising:
    the sixth module to determine when further optimization of the deployed set of resources is not viable for the pod and then to provide performance and cost metrics analysis on an analytics dashboard display.

3. The system of claim 1, wherein a set of generated performance metrics comprise performance metrics related to memory usage, processor time of each server, and hourly CTS per user.

4. The system of claim 1, further comprising:
    the sixth module to model in a proactive manner in real-time a set of performance metrics from the load test and to predict the orchestrated resources required in real-time for the pod.

5. The system of claim 3, further comprising:
    the sixth module to model in a proactive manner in real-time a set of performance metrics from the load test in order to prevent overuse or underuse of the deployed resources in the pod.

6. The system of claim 1, wherein the load test comprises a holistic load test of the deployed resources by use of an end-to-end solution of request in the pod.

7. The system of claim 1, further comprising:
    a multi-tenant platform configured to communicate via a cloud network with the first to sixth modules to enable the load test and to generate performance metrics of CTS for each user or group of users connected to the multi-tenant platform with access to pod.

8. The system of claim 1, further comprising:
    a plurality of types of performance metrics provided of the pod at least comprising: page metrics of page loading; server metrics of server processing time, request time of each layer of a server, number of calls and latency time of a server, application program interfaces (APIs) executions at a server, and server database structured query language (SQL) statements; and network metrics of network requests, time in a network layer, and network time API metrics.

9. A computer program product tangibly embodied in a computer-readable storage device and comprising instructions that when executed by a processor perform a cost-to-serve (CTS) method by load testing and measuring performance metrics of server sets, the method comprising:
    orchestrating, by a first module, an elastic server set of a plurality of resources comprising an app server, a database server, a storage server, a load balancer, and a network;
    orchestrating, by a second module coupled to the first module, a load test by applying one or more use-case scenarios for each orchestrated server set with a select number of simulated users, and further comprising a sub-module applying one or more docker containers executing a single instance of a virtual docker application for simulating the one or more use-case scenarios;
    generating, by a third module coupled to the second module, a cost metrics model of the orchestrated elastic server set for predictive CTS modeling of the orchestrated elastic server set;
    collecting, by a fourth module coupled to the third module, a plurality of performance metrics across server resources and associated client devices;
    post-processing, by a fifth module coupled to the fourth module the collected performance metrics across a load testing duration and providing analytics of an elastic server, set performance; and analyzing, by a sixth module coupled to the fifth module, the performance metrics adapting available resources by applying heuristics of the cost metrics model using the collected performance metrics for predicting models of cost optimizations of the elastic server set and repeating one or more prior method steps until reaching an orchestrated set of resources for the elastic server set.

10. The method of claim 9, further comprising:

determining, by the sixth module, when the repeating of steps for cost optimization of the orchestrated set of resources is no longer viable to continue for the elastic server set and in response thereto, providing performance and cost metrics analysis on an analytics dashboard display.

11. The method of claim 9, wherein the generated set of performance metrics comprise performance metrics related to memory usage, processor time of each server, and hourly CTS per user.

12. The method of claim 9, further comprising:

modeling, by the sixth module, in a proactive manner in real-time a set of performance metrics from the load test and to predict the orchestrated resources required in real-time for the elastic server set.

13. The system of claim 12, further comprising:

modeling, by the sixth model, in a proactive manner in real-time the set of performance metrics from the load test in order to prevent overuse or underuse of the orchestrated resources in the elastic server set.

14. The method of claim 9, wherein the load test comprises a holistic load test of the orchestrated resources by use of an end-to-end solution of each client device and a correspondent elastic server set.

15. The method of claim 9, further comprising:

configuring a multi-tenant platform to communicate via a cloud network with the first to sixth modules to enable the load test and to generate performance metrics of CTS for each user or group of users connected to the multi-tenant platform with access to the elastic server set.

16. An elastic node configuration system comprising:

at least one processor; and at least one computer-readable storage device comprising instructions that when executed causes execution of a method of cloud load testing and performance measuring of an orchestrated server configuration, the system performing the steps comprising:

configuring a first module to orchestrate an elastic server set of a plurality of resources comprising an app server, a database server, a storage server, a load balancer, and a network;

configuring a second module to orchestrate a load test by applying one or more use-case scenarios for each orchestrated server set with a select number of simulated users, and further comprising a sub-module applying one or more docker containers executing a single instance of a virtual docker application for simulating the one or more use-case scenarios;

configuring a third module to implement a cost metrics model of the orchestrated elastic server set for predictive CTS modeling of the orchestrated elastic server set;

configuring a fourth module to collect a plurality of performance metrics across server resources and associated client devices;

configuring a fifth module to post-process the collected performance metrics across a load testing duration and to provide analytics of the elastic server set performance; and configuring a sixth module to analyze the performance metrics to adapt available resources by applying heuristics of the cost metrics model using the collected performance metrics for predicting models of cost optimizations of the elastic server set and repeating one or more prior method steps until reaching an orchestrated set of resources for the elastic server set.

17. The system of claim 16, further comprising:

configuring the sixth module to determine when the repeating of steps for cost optimization of the orchestrated set of resources is no longer viable to continue for the elastic server set and in response thereto, providing performance and cost metrics analysis on an analytics dashboard display.

18. The system of claim 16, wherein the generated set of performance metrics comprise performance metrics related to memory usage, processor time of each server, and hourly CTS per user.

19. The system of claim 16, further comprising:

configuring the sixth module to model in a proactive manner in real-time a set of performance metrics from the load test and to predict the orchestrated resources required in real-time for the elastic server set.

20. The system of claim 19, further comprising:

configuring the sixth model to model in a proactive manner in real-time the set of performance metrics from the load test in order to prevent overuse or underuse of the orchestrated resources in the elastic server set.

* * * * *

UNITED STATES PATENT AND TRADEMARK OFFICE
CERTIFICATE OF CORRECTION

PATENT NO. : 11,307,957 B2
APPLICATION NO. : 16/677145
DATED : April 19, 2022
INVENTOR(S) : Ashraya Raj Mathur et al.

It is certified that error appears in the above-identified patent and that said Letters Patent is hereby corrected as shown below:

In the Claims

Column 19, Line 11, in Claim 10, "method of claim 9, further comprising" should be changed to --computer program product of claim 9, wherein the method performed by the processor further comprises--

Column 19, Line 18, in Claim 11, "method" should be changed to --computer program product--

Column 19, Line 22, in Claim 12, "method of claim 9, further comprising" should be changed to --computer program product of claim 9, wherein the method performed by the processor further comprises--

Column 19, Line 27, in Claim 13, "system of claim 12, further comprising" should be changed to --computer program product of claim 12, wherein the method performed by the processor further comprises--

Column 19, Line 32, in Claim 14, "method" should be changed to --computer program product--

Column 19, Line 36, in Claim 15, "method of claim 9, further comprising" should be changed to --computer program product of claim 9, wherein the method performed by the processor further comprises--

Signed and Sealed this
Sixteenth Day of August, 2022

Katherine Kelly Vidal
*Director of the United States Patent and Trademark Office*